H. W. CLARK.
COUPLING FOR METERS AND LIKE DEVICES.
APPLICATION FILED JULY 28, 1915.

1,281,293.

Patented Oct. 15, 1918.
2 SHEETS—SHEET 1.

Witness:
John Enders

Inventor:
Horace W. Clark
Fred Gerlach
by his Atty.

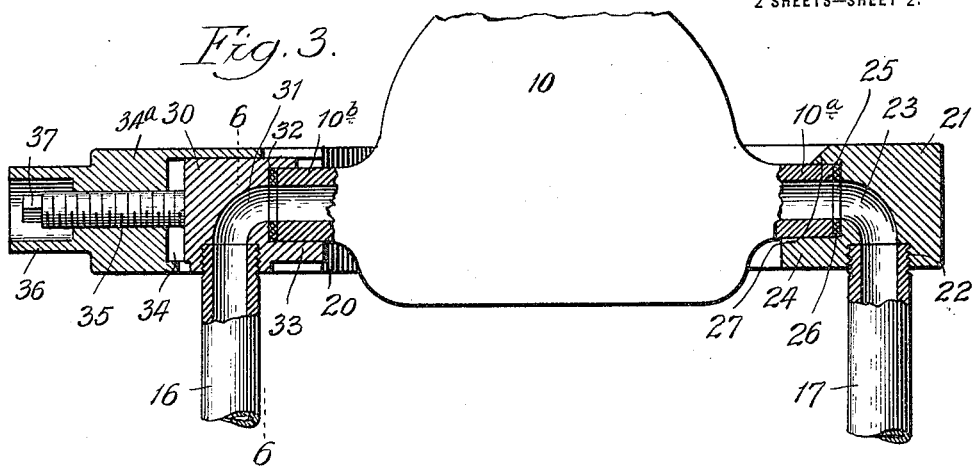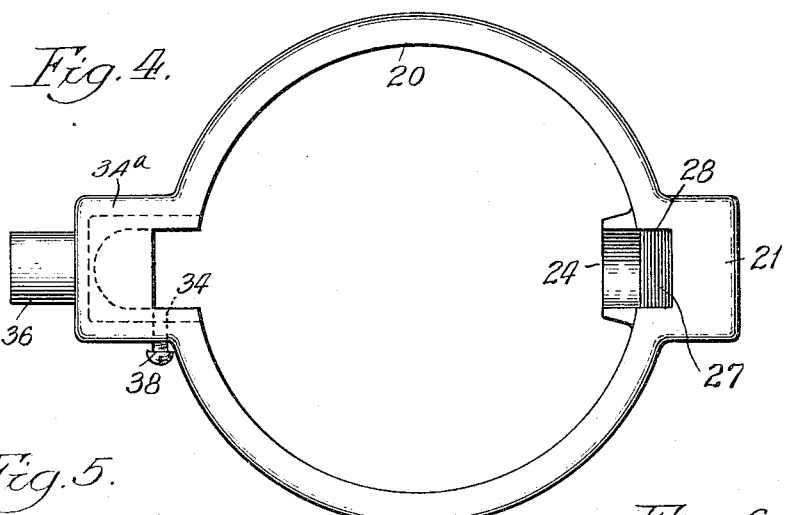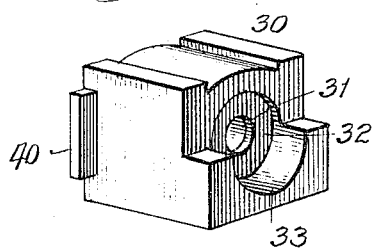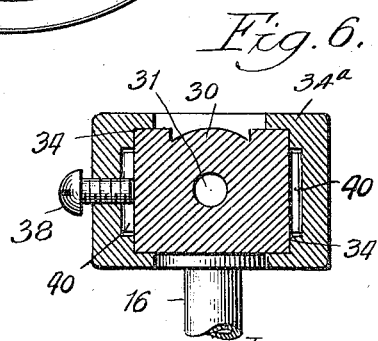

UNITED STATES PATENT OFFICE.

HORACE W. CLARK, OF MATTOON, ILLINOIS, ASSIGNOR TO H. W. CLARK CO., OF MATTOON, ILLINOIS, A CORPORATION OF ILLINOIS.

COUPLING FOR METERS AND LIKE DEVICES.

1,281,293.

Specification of Letters Patent. Patented Oct. 15, 1918.

Application filed July 28, 1915. Serial No. 42,399.

*To all whom it may concern:*

Be it known that I, HORACE W. CLARK, a resident of Mattoon, in the county of Coles and State of Illinois, have invented certain new and useful Improvements in Couplings for Meters and like Devices, of which the following is a full, clear, and exact description.

The invention relates to couplings for connecting pipes to water meters or like devices.

One object of the invention is to provide an improved meter-coupling which permits a meter to be quickly installed or removed and whereby the meter and its connections will be effectively secured against accidental displacement.

A further object of the invention is to provide an improved installation of water-meters whereby the pipe connections leading to and supporting the meter will efficiently secure the meter so that it will not be displaced laterally to a point near or in contact with the wall of the meter-box in which it is usually installed, such displacement sometimes causing freezing of the meter.

In practice, water meters are usually installed in boxes extending to a point below the frost line and designed to confine a body of air around the meter which will prevent its freezing when it is supported at a point above the frost line where it is accessible for inspection. The meter is usually supported upon risers from the service pipe and if the meter, as a result of any swinging permitted by the couplings or connections, should be displaced to contact with the wall of the meter box, freezing of the meter may result. Therefore, in this class of installations it is important that the meter should be efficiently supported against displacement and, in attaining this result, it is desirable to avoid the use of unions, elbows, fittings and joints as far as possible, and it is also desirable to provide a quickly operable and efficient coupling, so that the meter can be installed and removed with facility.

Other objects of the invention will appear from the description of the invention.

The invention consists in the several novel features hereinafter set forth and more particularly defined by claims at the conclusion hereof.

Figure 1:
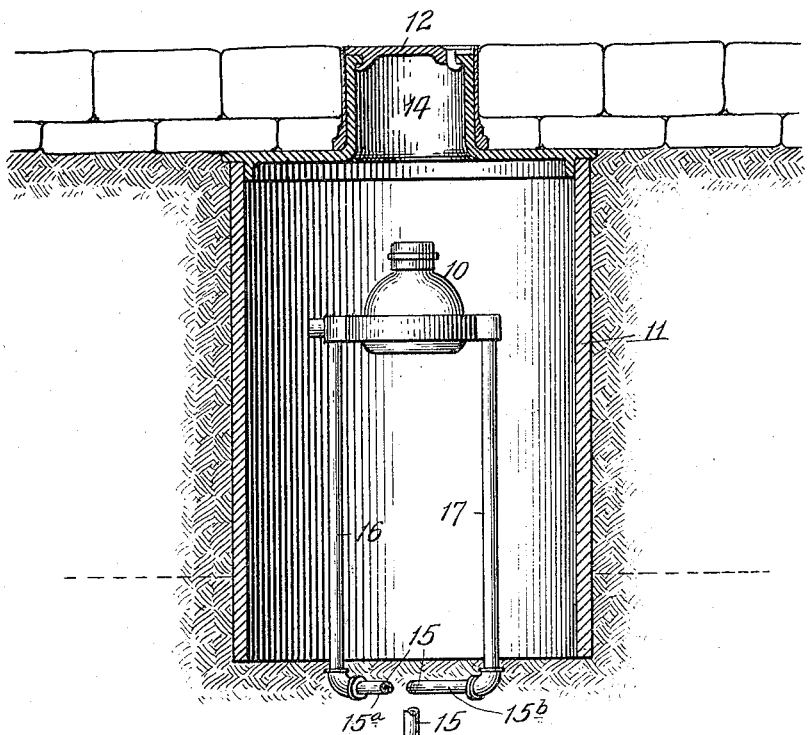
Figure 2:
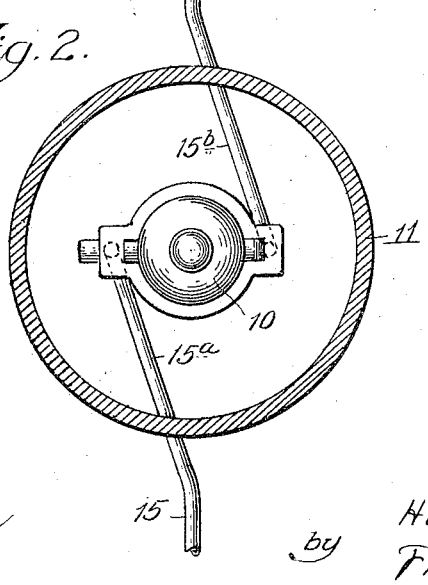

In the drawings: Figure 1 is a vertical section of an installation comprising a meter and embodying the invention. Fig. 2 is a plan, the meter box being shown in section. Fig. 3 is a vertical section through the coupling ring and its connections. Fig. 4 is a plan of the coupling ring. Fig. 5 is a detail perspective of the slidable coupling member. Fig. 6 is a section taken on line 6—6 of Fig. 3.

The invention is illustrated as applied to a water meter 10 of usual or any suitable construction and disposed in a meter box 11 which is provided with a removable lid 12 on a reduced upper portion or neck 14 of the box. In practice, it is customary to install the service pipe 15 below the frost line and to install the box above the service pipe, after the latter has been laid, as indicated by dotted lines in Fig. 2, and, in installing the meter, it is usually the practice to cut a section out of the service pipe for the attachment of risers leading to and from the meter or to have the ends of the service pipe leading into and out of the box at diametrically opposite points alined with the service pipe, and in such an installation there is nothing to positively prevent lateral displacement of the meter cross-wise of the service pipe. According to one feature of the present invention, the service pipe 15 is severed at one point only at the center of the box and the ends of the pipe within the box are bent laterally in opposite directions, as indicated at $15^a$ and $15^b$ and risers 16 and 17 are secured to the ends respectively by elbows of usual construction. By bending the pipe, as indicated, the risers will be disposed out of alinement with the general line of the service pipe, so that when the upper ends of the risers are secured together, as hereinafter set forth, the risers and their connections will be correlatively disposed to mutually resist lateral crosswise swinging of the risers and the parts supported thereby relatively to the box; that is to say, the risers will be disposed in a plane extending substantially at right angles to the general plane of a service pipe and the elbow connections between the risers and the ends of the service pipe and the rigid coupling at the meter will be effective to prevent swinging longitudinally of the service pipe, the risers forming, in effect, two vertical supports which prevent lateral movement of the meter in any direction.

The improved coupling comprises a ringlike member 20 which is adapted to extend around the meter and is provided with fixed means thereon at one side for forming a connection with and supporting one of the spuds 10$^a$ at one side of the meter, and an adjustable member for connection to and supporting the spud 10$^b$ at the other side of the meter. One side of the member 20 is provided with a lug or enlargement 21 which is adapted for screw-threaded connection to the riser 17, the upper end of the riser being provided with a screw-thread 22 adapted to screw into the bottom of lug 21. An elbow duct 23 is formed in said lug to conduct fluid from the riser to the meter, or vice versa. Member 20 is provided with an inwardly projecting, curved seat 24 adapted to receive and support one of the spuds of the meter, and with an annular recess or seat 25 adapted to receive the end of the spud and to form a connection between the ring and one of the spuds of the meter when said parts are clamped together. If desired, suitable packing 26 may be interposed between the seat 25 and the end of the spud to provide a water-tight joint and prevent leakage. An inclined surface 27 is formed on member 20 above seat 25 to guide the spud into the support 24 during placement of the meter in the ring, and also to force the meter into the support at the opposite side thereof, as will presently more fully appear.

The other riser 16 has its upper end screw-threaded into the bottom of an adjustable coupling block or member 30 which is provided with an elbow duct 31 for fluid conduction between the riser and the meter, an annular recess or seat 32 for one of the spuds on the meter and an inwardly projecting, curved seat or support 33 for the spud. Member 30 is slidable in a way or guide 34 which is formed in a lug 34$^a$ and opens inwardly into the ring and is closed at its outer end, and is open also on the bottom thereof to permit movement of the riser relatively to the ring when the riser is being connected to or disconnected from member 30. A clamp-screw 35 extends through the end of lug 34$^a$ and is adapted to engage the outer end of slidable member 30 to cause the meter to be firmly clamped between the seats 32 and 25 to effect a secure and water-tight connection between the spuds and the ring and the slidable member 30 respectively. A housing 36 extends around the outer end of screw 35 and, if desired, an irregular portion 37 may be formed on the screw so that it cannot be loosened except with a specially formed key or wrench to prevent unauthorized persons from tampering with the coupling or removing the meter. A retaining screw 38 is threaded through one side of lug 34$^a$ to engage a lug 40 on the outer end of one side of slidable member 30 to prevent said member from becoming lost during shipment or separated from the ring prior to installation.

In installing the meter, the service pipe is cut at one point only. The ends are then bent laterally in opposite directions and the risers are connected thereto by elbows. The ring 20 is then secured on the top of the riser 17. Member 30 can be withdrawn entirely from guideway 34, the screw 38 being first retracted to release lug 40, and when separated from the ring, member 30 will be secured onto the upper end of the other riser and then slipped from the inside of the ring into the guideway 34. At such time, screw 35 will be turned to permit member 30 to move outwardly as far as necessary in guideway 34. The coupling will then be ready to receive and support the meter. In placing the meter in the coupling, one of its spuds is first placed upon seat 33 and the other side of the meter is then forced downwardly onto the supporting lug 24 and in doing this, the spud 10$^a$ will ride on and engage the inclined surface 27 which will act as a cam surface to force the other spud into the seat 32 in member 30. Screw 35 will then be turned to force the member 30 inwardly so that the meter will be securely clamped between the fixed seat on the ring and the adjustable member 30, the ends of the spuds causing water-tight connections to be made between the meter and the coupling members, to which the risers are respectively connected.

It will be observed that the elbow between the riser 16 and the service pipe is arranged so as to permit easy adjustment of the coupling member secured to the upper end of the riser and until the coupling has been secured to the meter.

In practice, the adjustable member and the clamping screw are usually formed of brass and the ring member is made of iron, but it will be understood that any suitable metal may be used.

The invention thus exemplifies an improved coupling for meters and like devices, in which the use of union couplings or right and left-hand fittings is avoided. In installing the coupling, the necessity of cutting out a section of the service pipe or making two cuts is avoided. The coupling and member are rigidly sustained by the riser pipes and connections so that all danger of the meter being displaced into contact with the wall of the box, and resultant freezing, are avoided. Connection and disconnection of the meter and coupling may be readily and easily made. The operation of a single screw serves to clamp the meter in the coupling. The coupling is adapted for meters different in form, construction or size, as the result of the wide range of adjustment provided for of the single adjustable member. By providing a screw operable only by a special key, the necessity of providing a seal to indicate whether the connections of the meter have been disturbed is avoided.

The improved coupling, although described and illustrated as applied to a watermeter in a meter-box, may be used to advantage in connection with other meters and like devices in other places, such, for example, as in meter-testing machines.

The invention is not to be understood as restricted to the details set forth, since these may be modified within the scope of the appended claims, without departing from the spirit and scope of the invention.

Having thus described my invention, what I claim as new, and desire to secure by Letters Patent, is:—

1. In a coupling for meters and like devices, the combination of a member formed to encircle the device and provided with an integral part adapted for the attachment of a riser pipe thereto and having a fluid duct therein, a block horizontally slidable in said member at one side thereof and having an elbow duct therein, an integral guide in said member in which said block is horizontally slidable, said block being adapted for attachment of a riser thereto, and means for forcing the block inwardly in the guide.

2. In a coupling for meters and like devices having spuds, the combination of a pair of movable connected members, each provided with means for the attachment of a pipe thereto, with a fluid duct and with a socket for receiving a spud on the device, one of the members being formed to encircle the device, means for relatively operating the members to clamp the device between them, and means on one of the members for forcing the device into the seat on the other member in placement of the device between the members, said sockets having walls completely encircling the spuds.

3. In a coupling for meters and like devices having spuds, the combination of a ring member and a member slidable therein, each member being provided with means for the attachment of a pipe thereto, and with means for engaging a spud on the device, and a screw in the ring-member, extending laterally and outwardly from the slidable member and engaging the slidable member to clamp the device between the members.

4. In apparatus of the character described, the combination of a meter box, a service pipe having horizontal portions substantially radial relatively to the box and having portions axially aligned and portions bent laterally adjacent the box, risers coupled to the ends of the bent portions of the pipe and disposed in offset relation relatively to the axis of the aligned portions of the pipe, coupling members secured to the upper ends of and supported by the risers respectively, and means for securing a meter box to the coupling members.

HORACE W. CLARK.

Witnesses:
D. G. TRENCH,
WILBERT HILL.

Copies of this patent may be obtained for five cents each, by addressing the "Commissioner of Patents, Washington, D. C."